United States Patent Office 3,101,809
Patented Aug. 27, 1963

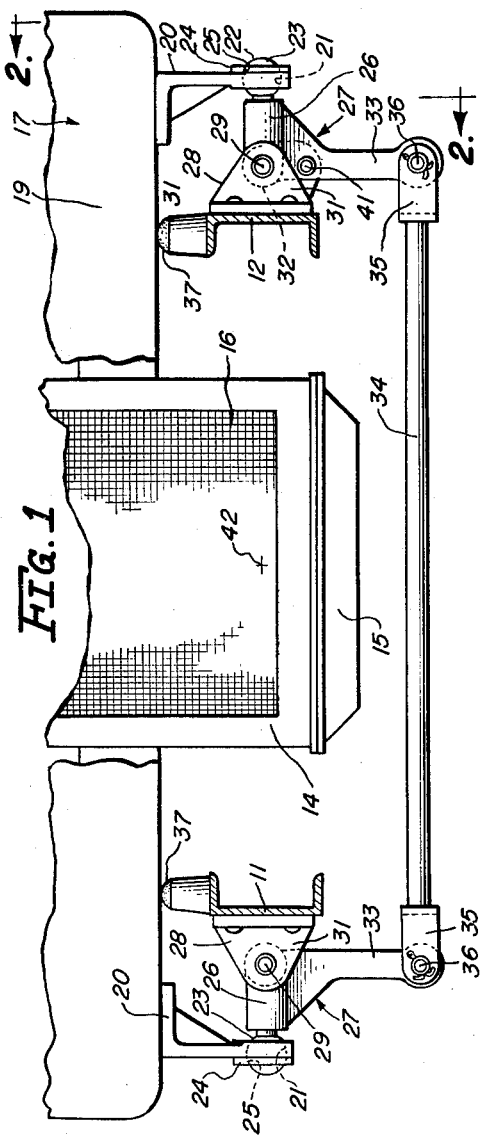
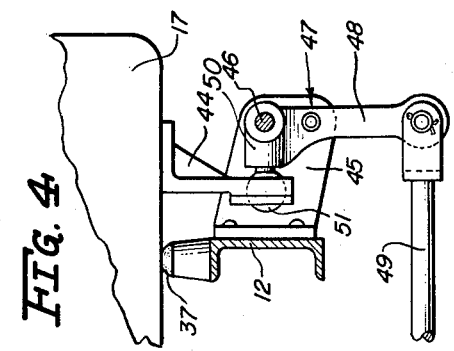
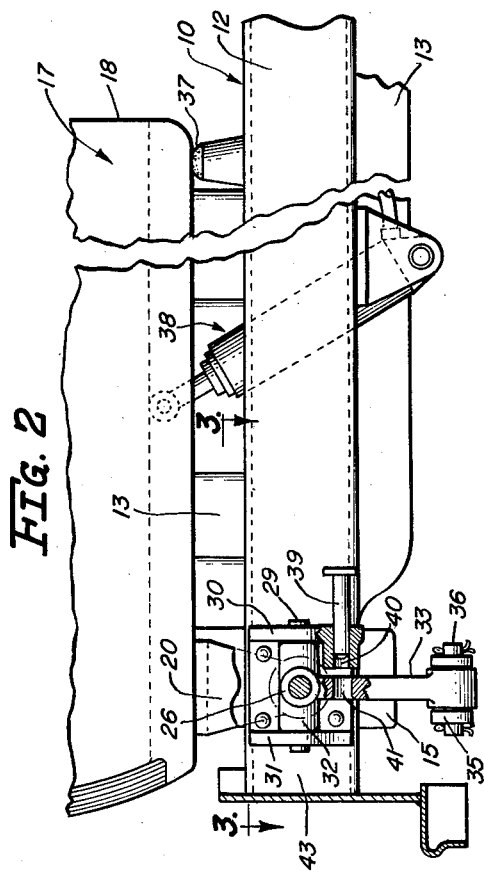
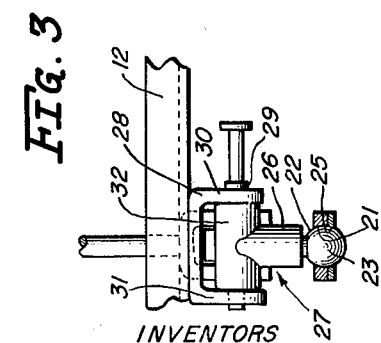

3,101,809
VEHICLE CAB MOUNTING MEANS
Gerald W. Hostetler and Vergil W. Kelley, Fort Wayne, Ind., assignors to International Harvester Company, Chicago, Ill., a corporation of New Jersey
Filed Oct. 6, 1961, Ser. No. 143,380
15 Claims. (Cl. 180—89)

This invention relates to a new and improved motor vehicle cab mounting means and more particularly to a novel structure for supporting a forwardly tilting cab-over-engine type of motor vehicle.

Automotive engineers have effectively mitigated the damaging influence of the torsional forces imposed on the chassis frame generally caused by one or more ground-engaging wheels being elevated differently than the others as when the vehicle is driven over an uneven terrain or road surface irregularities by providing a chassis frame which is relatively flexible and capable of relieving the torsional forces imposed thereon. Heretofore, it has been the usual practice in the motor truck industry to secure the vehicle cab directly to the chassis frame in such a manner that very little, if any, relative movement between the chassis frame and vehicle cab was permitted. Consequently, the distorting forces and shocks to which the chassis frame was subjected were transmitted directly and fully to the vehicle cab causing deformation of the sheet metal parts of the vehicle cab and ultimate breakage thereof.

With the commercial introduction of forwardly tilting cab-over-engine type trucks wherein the cab or operator's compartment is mounted directly over the vehicle propulsion engine or power plant and is capable of tilting forwardly to provide accessibility to the engine and engine pertinances, the problem of mounting the vehicle cab on the chassis frame became more acute. The cab mounting structure for a forwardly tilting motor truck cab must not only perform the functions of a conventional cab mounting structure which is to secure the vehicle cab to the chassis frame in such a manner that road vibrations are isolated from the cab, but it must also provide trunnion means for permitting the vehicle cab to be tilted forwardly with respect to the chassis frame to facilitate engine servicing. Heretofore, it has been the usual practice in the motor truck industry in order to permit the vehicle cab to tilt forwardly with respect to the chassis frame for engine servicing, to accept a design compromise and render the cab mounting less capable of relieving the torsional forces imposed on the cab by distortion of the frame side sills since certain of the mounting connections involve trunnion members for connecting the vehicle cab directly to the chassis frame in a relatively rigid manner when the vehicle cab is in its normally lowered position. As a result, the forward end of the vehicle cab was secured directly to the chassis frame in such a manner that very little, if any, relative movement between the chassis frame and the vehicle cab was permitted when the vehicle cab was in its normally lowered position. It is therefore the primary objective of the present invention to provide a novel mounting structure for a vehicle cab of a forwardly tilting cab-over-engine type motor truck which allows a limited but adequate relative movement between the vehicle cab and the chassis frame when the cab is in its normally lowered engine-enclosing position whereby the distorting forces, shocks and vibrations to which the chassis frame is subjected are transmitted to a lesser degree than heretofore has been possible and which structure permits the vehicle cab to be readily swung forwardly from its normally lowered engine-enclosing position to a forwardly tilted position in order to gain access to the engine and engine appurtenances.

Still another object is to provide a pair of operatively interconnected structures for connecting the forward end of a forwardly tilting cab-over-engine type vehicle cab to a chassis frame at two transversely spaced points, which structures function with other structures at the rearward end of the vehicle cab as resilient supporting means when the vehicle cab is in its normally lowered engine-enclosing position, but which also permit the vehicle cab to be swung about a transversely extending axis between its normally lowered position and a forwardly tilted position.

Still another object is to provide mounting structure for connecting a vehicle body to a chassis frame which includes two support points at the rearwardmost end of the body, one on either side, and two support points at the front of the vehicle body, one on either side, whereby the mounting structure functions as a four-point cab mounting system when the chassis frame is not being subjected to torsional or twisting forces, but which functions as a three-point mounting vehicle body mounting system with one of the points approximately on the center line of the vehicle when severe torsional stresses and forces are imposed on the chassis frame tending to twist the same in order to mitigate the transmission of forces, shocks and vibrations to the vehicle body.

The foregoing and other important objects and desirable features inherent in and encompassed by the invention together with many of the purposes and uses thereof will become readily apparent with a reading of the ensuing description in conjunction with the annexed drawings in which:

FIGURE 1 is a front elevational view of the forward end of a tilt cab type cab-over-engine motor truck embodying the invention; a portion of the structure is cut away and in section to better illustrate the invention and the vehicle cab is shown in its lowered or engine enclosing position;

FIGURE 2 is a vertical sectional view taken substantially along line 2—2 of FIGURE 1;

FIGURE 3 is a horizontal sectional view taken substantially along line 3—3 of FIGURE 2; and FIGURE 4 is a fragmentary front elevational view of a modified form of the connecting means between the chassis frame and the vehicle cab.

Referring to the drawings in detail wherein like reference characters represent like elements throughout the various views there is shown the forward portion of a motor truck chassis frame 10 which includes a pair of transversely spaced, longitudinally extending, channel-shaped side sill members 11 and 12 which are interconnected by transversely extending, longitudinally spaced cross members, not shown. The rearwardly disposed end and the forwardly disposed end of the chassis frame 10 are supported off the ground by power-driven ground engaging wheels and steerable ground engaging wheels respectively not shown, which ground engaging wheels are resiliently connected to the chassis frame 10 by springs, not shown, in a conventional manner. It is to be understood that non-essential details are not material to practice the invention.

The vehicle power plant or engine partially shown and designated by numeral 13 is resiliently mounted in a suitable manner adjacent the forward end of the chassis frame 10 and centrally thereof. The engine 13 is of any conventional multi-cylinder liquid cooled type.

The radiator structure 14 for cooling the liquid engine coolant is mounted on the chassis frame 10 forwardly of and substantially in longitudinal alignment with the engine 13 as in conventional installations to obtain the maximum cooling efficiency of the radiator structure without the need for complicated and costly duct work. The radiator structure 14 illustrated in FIGURE 1 is connected to the chassis frame 10 directly by conventional means not shown and includes a lower header 15, a radiator core 16 through which the liquid coolant is circulated and an upper header not shown. When the operator's compartment designated generally by numeral 17 is in its normally lowered position as shown in FIGURE 1, cooling air is drawn through the radiator structure 14 by an engine driven fan not shown, longitudinally spaced intermediate the engine 13 and the radiator structure 14.

The operator's compartment or cab 17 is conventional and includes a back panel 18 joined to a roof not shown which in turn is connected to a windshield frame not shown. The windshield frame is integrally formed with a depending front panel 19. The operator's compartment 17 is provided with suitable side doors and also includes a frame which is utilized to interconnect the various body parts enumerated above to increase the strength and rigidity of the assembled operator's compartment.

Secured to the underside of the cab frame adjacent to the forward end of the operator's compartment 17 are a pair of transversely spaced, depending cab trunnion elements 20. The lower end of each trunnion element 20 is provided with an opening therethrough which is defined by a spherically-curved, concave surface 21. The outer spherical surface 22 of a ball element 23 is adapted to be seated upon the concave surface 21 of each trunnion element 20. A retainer 24 having a complementary spherically-curved, concave surface 25 is suitably fastened to the lower end of each trunnion element 20 in order to maintain the ball elements 23 connected to the trunnion elements 20. Each ball element 23 is fixedly connected to the outermost end of one leg 26 of a substantially L-shaped bellcrank 27. Each bellcrank 27 is pivotally connected to the chassis frame 10 by means of a U-shaped bracket 28 and a pivot pin 29 for relative pivotal movement about a longitudinally extending, substantially horizontal axis. Each bracket 28 is secured to a respective side sill member 11, 12 with the longitudinally spaced and parallel legs 30, 31 thereof extending transversely outwardly. Each pair of legs 30, 31 carries a pivot pin 29. Each pivot pin 29 extends through a bearing 32 formed in each bellcrank 27 at the juncture of the horizontally extending leg 26 and the vertically extending leg 33 thereof. The bellcranks 27 are interconnected by means of a horizontal, transversely extending rod 34 which has bifurcated end portions 35. The lowermost end of each vertically extending leg 33 is received between the bifurcations of a respective end portion 35 and a pivot pin 36 is utilized to connect each vertically extending leg 33 and a respective end portion 35 of the rod 34 whereby the bellcranks 27 are operatively connected together. From the foregoing, it will be appreciated that the operator's compartment 17 is capable of pivoting with respect to the chassis frame 10 about a transversely extending, horizontal axis passing through the ball elements 23 from a normally lowered position shown in FIGURE 1 to a raised, forwardly tilted position (not shown). It will also be appreciated that the bellcranks 27 are constrained to pivot in unison and in the same direction with respect to the chassis frame 10. When the operator's compartment 17 is in the position shown in FIGURE 1, the front end thereof is supported by the chassis frame 10 through the intermediary of the trunnion elements 20, bellcranks 27, ball elements 23, brackets 28 and the rod 34. The rear end of the operator's compartment 17 is supported by the chassis frame 10 through the intermediary of a pair of resilient pads 37 made of rubber or like material each of which is carried by the uppermost surface of a respective side sill member 11, 12. The resilient pads 37 also function as stabilizers for maintaining the operator's compartment 17 upright when in its normally lowered position and prevent excessive oscillation or movement of the cab 17. Suitable quick releasable latch means (not shown) are provided for latching the operator's compartment 17 in its normally lowered position, shown in FIGURE 1, with the rearwardmost end of the cab underside firmly pressed into abutting engagement with the resilient pads 37. When the latch mechanism is released, the operator's compartment 17 is free to be swung forwardly about the pivotal axis defined by a transversely extending line passing through the ball elements 23 interconnecting the trunnion elements 20 and bellcranks 27 which line lies in a substantially horizontal plane when the vehicle is stopped or traversing a level roadbed. Power actuated means in the form of a hydraulic piston and cylinder unit 38, having one end pivotally connected to the underside of the vehicle operator's compartment 17 and its opposite end pivotally connected to the chassis frame 10, is utilized to provide the effort required to swing the operator's compartment forwardly from its normally lowered position.

From the foregoing it will be appreciated that the mechanism described above for connecting the forward end of the operator's compartment to the chassis frame 10 permits the vehicle cab 17 to lean or tilt to one side or the other once the rear of the cab is released and is being raised. Unless the operator's compartment 17 is perfectly balanced which is seldom, if ever, the case, the pivotal axis of the cab extending through the ball elements 23 will not remain horizontal as desired. To obviate this undesirable characteristic of the cab forward mounting means, a lock in the form of a pin 39 is provided for preventing the bellcranks 27 from pivoting about the pivot pins 29 as the operator's compartment 17 is being tilted about the transversely extending pivotal axis of the cab through the ball elements 23 and for maintaining the pivotal axis in a horizontal plane. The pin 39 is adapted to be inserted in a longitudinally extending bore 40 provided in the leg 30 of one of the U-shaped brackets 28 and extends through a registerable bore 41 formed through the vertical leg 33 of an associated bellcrank 27. The bores 40, 41 are in longitudinal alignment when the cab pivotal axis lies in a horizontal plane. It is to be understood that other devices or mechanisms could be provided for clamping or locking the bellcranks 27 to the chassis frame 10 without departing from the spirit and scope of the invention.

In operation, when it is desired to raise the operator's compartment 17, the lock pin 39 is inserted through the registering bores 40 and 41 and the piston and cylinder assembly 38 is expanded after the cab rear latch means is released. The operator's compartment 17 then pivots forwardly with respect to the chassis frame 10 about the transversely extending horizontal axis extending through the ball elements 23 to its fully raised position. In order to lower the operator's compartment 17, the above procedure is reversed and once the cab latch means is secured the lock pin 39 is removed from engagement with the bores 40 and 41. Link means (not shown) are provided to limit the swing of the operator's compartment 17 from its normally lowered position and to establish the fully raised position thereof.

In normal operation of the vehicle over a comparatively level and smooth road bed, the chassis frame twist is practically non-existent. Assuming that the vehicle cab 17 is in its normally lowered engine-enclosing position, the entire weight thereof is transmitted to the chassis frame 10 through the two transversely spaced, resilient pads 37 at the rearward end of the cab and the two transversely spaced bellcranks 27 at the forward end of the operator's compartment 17. Thus, the cab 17 is connected to the chassis frame 10 at four points. The horizontal component of force applied to one bellcrank 27 by the weight of the operator's compartment 17 nullifies the horizontal force component applied to the other bell crank 27 by the weight of the operator's compartment 17 transmitted thereto through the rod 34 which is placed in compression. The front cab mounting structure described hereinbefore is actually a two-point mounting means since the operator's compartment 17 is, in reality, connected to the chassis frame 10 at two transversely spaced points at the forward end thereof, but which functions as a single point cab mounting means when the chassis frame 10 is subjected to severe twisting conditions. The virtual center, indicated by reference character 42, of the front cab support mechanism or structure described hereinbefore is at the intersection of a transversely extending line passing through the ball element 23 and intersecting a vertical plane containing the longitudinal median line of the chassis frame 10. The virtual center 42 is also the point about which the front cab support structure permits the forward end of the cab 17 to rock or roll with respect to the chassis frame 10. In other words, the front mounting structure permits the operator's compartment 17 to pivot with respect to the chassis frame 10 about a longitudinal axis extending through the virtual center 42. As stated hereinbefore, the quick releasable latch means at the rearward end of the cab 17 when latched maintains the rearward end of the cab in abutting engagement with the resilient pads 37 and the pads 37 function as stabilizers to prevent excessive rocking or rolling of the cab 17 with respect to the chassis frame 10 about a longitudinal axis passing through the virtual center 42 of the cab front mounting structure. It will be appreciated also that the cab 17 is maintained in a relatively fixed upright position with respect to the chassis frame 10 by virtue of the fact that the rearward end of the cab 17 is pressed firmly into abutting engagement with the resilient pads 37 when latched in its normally lowered, engine-enclosing position. Twisting or flexing of the chassis frame 10 wherein the forward end of one of the side sill members 11, 12 is raised with respect to the other side sill member 11, 12 is effectively accommodated without imposing severe damaging strains on the sheet metal parts of the vehicle cab structure 17. As an example, if the forward end, indicated by numeral 43 in FIGURE 2, of the side sill member 12 is suddenly displaced vertically upwardly with respect to the side sill member 11, the resulting force is not transmitted to the vehicle cab structure 17 to torsionally distort the same. The U-shaped bracket 28 attached to the side sill member 12 as well as the bellcrank 27 which is connected to the bracket 28 by means of the pivot pin 29 are also displaced vertically upwardly with respect to the forward end of the side sill member 11 by virtue of the ball and socket connection between the bellcrank 27 and the trunnion element 20 and the pivotal connection of the bellcrank 27 with the bracket 28. The forward end 43 of the side sill member 12 is permitted to approach the underside of the operator's compartment 17 by pivoting of the bellcrank 27 in a clockwise direction as viewed in FIGURE 1. When this occurs, the bellcrank 27 operatively connected to the forward end of the side sill member 11 also pivots in a clockwise direction the same amount because of the connection between the bellcranks 27 provided by the transversely extending rod 34. Thus, the operator's compartment 17 is maintained in a substantially upright position even though the forward ends of the side sill members 11 and 12 are being displaced vertically with respect to each other. In other words, the front cab mounting structure permits the operator's compartment 17 to pivot about the virtual center 42 with respect to the chassis frame 10 and thus relative movement between the operator's compartment 17 and the forward end of the chassis frame 10 caused by twisting of the chassis frame is effectively accommodated and has very little, if any, damaging influence on the operator's compartment 17. Once the vehicle has passed over the road bed irregularity, the vehicle cab 17 assumes its normal upright steadied position by simultaneous counter-clockwise pivoting of the bellcranks 27 to the positions shown in FIGURE 1. It is believed obvious that a minimum amount of road shock is transmitted to the vehicle cab structure 17 by mounting the vehicle cab as described above. The damaging forces are effectively dissipated by the capability of the forward end of the chassis frame 10 to twist relatively to the operator's compartment 17. As pointed out above, the capability of the cab 17 to rock relatively to the chassis frame 10 is brought about by the novel construction and arrangement of the four-point cab connecting means which functions as a three-point mounting whenever the chassis frame 10 is torsionally distorted. It will also be appreciated that by using the ball and socket principle in the front cab mounting structure, a trunnion means is provided for permitting forwardly tilting of the cab to gain access to the engine.

Referring to FIGURE 4, a modified form of connection between one side of the forward end of the operator's compartment 17 and the chassis frame 10 is illustrated. While only a portion of the cab front mounting structure attached to side sill member 12 is shown, it is to be understood that the entire cab front mounting structure includes duplicate elements arranged in the same manner at the forward end of the other side sill member, not shown.

Attached to the underside of the operator's compartment 17 at transversely spaced points are trunnion elements 44 which are similar to the trunnion elements 20 described hereinbefore. The web portion of a U-shaped bracket is secured to the side sill member 12 with the legs thereof extending transversely outwardly. The legs of the bracket 45 carry a pivot pin 46 for pivotally supporting a substantially L-shaped bellcrank 47. The vertically extending leg 48 of the bellcrank 47 has its free end pivotally connected to one end of a transversely extending rod 49. Thus, as the rod 34 of the front mounting structure shown in FIGURE 1, the rod 49 is utilized to operatively interconnect the transversely spaced bellcranks 47. The horizontally extending leg 50 of each bellcrank 47 extends substantially horizontally inwardly from the pivot pin 46 and the innermost end thereof is provided with a ball element 51 which is received in the socket provided in the lowermost end of a respective trunnion element 44. Lock means, similar to the pin 39 and registerable bores 40 and 41, are also provided for preventing pivoting of the bellcranks 48 when the cab 17 is being moved between its normally lowered position and its forwardly tilted, raised position. From the foregoing, it will be appreciated that the only structural difference between the cab front mounting structure shown in FIGURE 1 and the cab front mounting structure shown in FIGURE 4 is in the disposition of the generally horizontal leg 50 of the bellcrank 47. The horizontal legs 26 of the bellcranks 27 extend transversely outwardly with respect to the pivot pins 29 whereas the legs 50 of the bellcranks 47 extend transversely inwardly with respect to the pivot pins 46. Consequently, instead of the transverse rod 49 being placed in compression by the weight of the cab acting through the bellcranks 47 in the same manner as the rod 34 is placed in compression by the weight of the cab acting through the bellcranks 27, the rod 49 is placed in tension. But for this fact, the cab front mounting structures shown in FIGURES 1 and 4 function and operate in the same manner. Depending on the general vehicle configuration, obstructions existing, and the space available for the cab front mounting structure, the cab front mounting structure shown in FIGURE 1 may be more readily adaptable for use than the cab front mounting structure shown in FIGURE 4 in a particular vehicle installation, or vice versa. However, the front mounting structures illustrated in FIGURES 1 and 4 both serve to isolate the cab 17 from chassis frame twisting in the same manner.

The embodiments of the invention chosen for the purposes of illustration and description herein are those preferred for achieving the objects of the invention and developing the utility thereof in the most desirable manner, due regard being had to existing factors of economy, simplicity of design and construction and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In a motor vehicle having a longitudinal frame and a body, the combination including said frame and body comprising, means for connecting the rearward end of said body to said frame, said means being releasable to disconnect said rearward end of said body from said frame mounting structure operatively interconnecting the forward end of said body to said frame for universal pivotal movement about a single point contained in a vertical plane passing through the longitudinal median line of said frame, and latch means cooperable with said mounting structure for only permitting pivotal movement of said body with respect to said frame about a single, transversely extending, horizontal axis whereby said body is capable of pivoting about said axis when said means connecting the rearward end of said body to said frame are released.

2. In a motor vehicle having a longitudinal frame and a body, the combination including said frame and body comprising, means for connecting the rearward end of said body to said frame, said means being releasable to disconnect said rearward end of said body from said frame, mounting structure operatively interconnecting the forward end of said body to said frame for universal pivotal movement about a single point contained in a vertical plane passing through the longitudinal median line of said frame, and latch means cooperable with said mounting structure for only permitting pivotal movement of said body with respect to said frame about a single transversely extending, horizontal axis passing through said single point whereby said body is capable of pivoting about said axis between a normally lowered position and a raised, forwardly tilted position when said means connecting the rearward end of said body to said frame are released.

3. In a motor vehicle having a longitudinal frame and a body, the combination including said frame and body comprising, means for connecting the rearward end of said body to said frame at a pair of points, said points being transversely spaced from a vertical plane passing through the longitudinal median line of said frame, and releasable to disconnect said rearward end of said body from said frame mounting structure operatively interconnecting the forward end of said body to said frame for universal pivotal movement about a single point contained in a vertical plane passing through the longitudinal median line of said frame and latch means cooperable with said mounting structure for only permitting pivotal movement of said body with respect to said frame about a single horizontal axis passing through said single point whereby said body is capable of pivoting about said axis when said means connecting the rearward end of said body to said frame are released.

4. In a motor vehicle having a longitudinal frame and a body, the combination including said frame and body comprising, resilient means for connecting the rearward end of said body to said frame at a pair of points, said points being transversely spaced from a vertical plane passing through the longitudinal median line of said frame, said means being releasable to disconnect said rearward end of said body from said frame, mounting structure operatively interconnecting the forward end of said body to said frame for universal pivotal movement about a single point contained in a vertical plane passing through the longitudinal median line of said frame, and latch means cooperable with said mounting structure for only permitting pivotal movement of said body with respect to said frame about a single transversely extending, horizontal axis passing through said single point whereby said body is capable of pivoting between a normally lowered position and a raised, forwardly tilted position when said resilient means are released.

5. In a motor vehicle having a longitudinal frame and a body, the combination including said frame and body comprising, resilient means for connecting the rearward end of said body to said frame including a pair of pads of resilient material carried by said frame and engaged by said body, said pads being transversely spaced from a vertical plane passing through the longitudinal median line of said frame, said means being releasable to disconnect said rearward end of said body from said frame, mounting structure operatively interconnecting the forward end of said body to said frame for universal pivotal movement about a single point contained in a vertical plane passing through the longitudinal median line of said frame, and latch means cooperable with said mounting structure for preventing universal pivotal movement of the forward end of said body about said single point and only permitting pivotal movement of said cab with respect to said frame about a single transversely extending, horizontal axis passing through said single point whereby said body is capable of pivoting about said axis between a normally lowered position and a raised, forwardly tilted position when said resilient means are released.

6. In a motor vehicle having a longitudinal frame and a body, the combination including said frame and body comprising, resilient means for connecting the rearward end of said body to said frame including a pair of pads of resilient material, said pads being carried by said frame and engageable with said body, said pads being transversely spaced from a vertical plane passing through the longitudinal median line of said frame, and mounting structure operatively interconnecting the forward end of said body to said frame for universal pivotal movement about a single point contained in a vertical plane passing through the longitudinal median line of said frame, including a pair of transversely spaced, lever means, each lever means having one end connected to said body for universal pivotal movement and a portion thereof pivotally connected to said frame, said mounting structure further including transversely extending means operatively interconnecting said lever means whereby said lever means are constrained to pivot in unison with respect to said frame in the same direction.

7. In a motor vehicle having a longitudinal frame and a body, the combination including said frame and body comprising, resilient means for connecting the rearward end of said body to said frame including a pair of pads of resilient material, said pads being carried by said frame and engageable with said body, said pads being transversely spaced from a vertical plane passing through the longitudinal median line of said frame, said resilient means being releasable to disconnect the rearward end of said body from said frame, mounting structure operatively interconnecting the forward end of said body to said frame for universal pivotal movement about a single point contained in a vertical plane passing through the longitudinal median line of said frame, including a pair of transversely spaced, lever means, each lever means having one end connected to said body for universal pivotal movement and a portion thereof pivotally connected to said frame, said mounting structure further including transversely extending means operatively interconnecting said lever means whereby said lever means are constrained to pivot in unison with respect to said frame in the same direction, and latch means cooperable with said mounting structure for preventing universal pivotal movement of said body with respect to said frame and only permitting pivotal movement of said body with respect to said frame about a single transversely extending horizontal axis passing through said single point whereby said body is capable of pivoting about said axis between a normally lowered position and a raised, forwardly tilted position when said resilient means are released.

8. In a motor vehicle having a longitudinal frame and a body, the combination including said frame and body comprising, resilient means for connecting the rearward end of said body to said frame, mounting structure operatively interconnecting the forward end of said body to said frame including a pair of transversely spaced levers, each lever having one end connected to said body for universal pivotal movement and a portion intermediate the ends thereof connected to said frame for pivotal movement about a longitudinally extending axis, said mounting structure further including a transversely extending rod having each end thereof pivotally connected to a respective lever whereby said levers are constrained to pivot in unison with respect to said frame in the same direction.

9. In a motor vehicle having a longitudinal frame and a body, the combination including said frame and body comprising, resilient means for connecting the rearward end of said body to said frame, said resilient means being releasable to disconnect the rearward end of said body from said frame, and mounting structure operatively interconnecting the forward end of said body to said frame including a pair of transversely spaced levers, each lever having one end connected to said body for universal pivotal movement and a portion intermediate the ends thereof connected to said frame for pivotal movement about a longitudinally extending axis, said mounting structure further including a transversely extending rod having each end thereof pivotally connected to a respective lever whereby said levers are constrained to pivot in unison with respect to said frame in the same direction, and latch means for preventing pivotal movement of said levers with respect to said frame whereby said body is capable of pivoting in a transversely extending, horizontal axis between a normally lowered position and a raised, forwardly tilted position when said resilient means are released.

10. In a motor vehicle having a longitudinal frame and a body, the combination including said frame and body comprising, resilient means for connecting the rearward end of said body to said frame, and mounting structure operatively interconnecting the forward end of said body to said frame including a pair of transversely spaced, substantially L-shaped bellcranks, each bellcrank having one end connected to said body for universal pivotal movement and a portion at the juncture of the legs thereof connected to said frame for pivotal movement about a longitudinally extending axis, said mounting structure further including a transversely extending rod having each end thereof pivotally connected to the end of a respective bellcrank opposite the end thereof connected to said body whereby said bellcranks are constrained to pivot in unison with respect to said frame in the same direction.

11. In a motor vehicle having a longitudinal frame and a body, the combination including said frame and body comprising, resilient means for connecting the rearward end of said body to said frame, said means being releasable to disconnect the rearward end of said body from said frame, mounting structure operatively interconnecting the forward end of said body to said frame including a pair of substantially L-shaped bellcranks, each bellcrank having one end connected to said body for universal pivotal movement and a portion at the juncture of the legs thereof connected to said frame for pivotal movement about a longitudinally extending axis, said mounting structure further including a transversely extending rod having each end thereof pivotally connected to the end of a respective bellcrank opposite the end thereof connected to said body whereby said bellcranks are constrained to pivot in unison with respect to said frame in the same direction, and latch means for preventing pivotal movement of said bellcranks with respect to said frame whereby said body is capable of pivoting about a transversely extending horizontal axis between a normally lowered position and a raised, forwardly tilted position when said resilient means are released.

12. In a motor vehicle having a longitudinal frame and a body, the combination including said frame and body comprising, resilient means for connecting the rearward end of said body to said frame, said means being releasable to disconnect the rearward end of said body from said frame, and mounting structure operatively interconnecting the forward end of said body to said frame including a pair of transversely spaced substantially L-shaped bellcranks, a transversely extending rod having each end thereof pivotally connected to one end of a respective bellcrank whereby said bellcranks are constrained to pivot in unison with respect to said frame in the same direction, and connecting means for connecting the end of each bellcrank opposite the end thereof connected to said rod to said body for universal pivotal movement, and latch means for preventing pivotal movement of said bellcranks with respect to said frame whereby said body is capable of pivoting about a substantially horizontal axis extending transversely through said connecting means between a normally lowered position and a raised, forwardly tilted position when said resilient means are released.

13. In a motor vehicle having a longitudinal frame and a body, the combination including said frame and body comprising, resilient means for connecting the rearward end of said body to said frame including a pair of pads of resilient material carried by said frame and engaged by said body, said pads being transversely spaced from a vertical plane passing through the longitudinal median line of said frame, and mounting structure operatively interconnecting the forward end of said body to said frame including a pair of transversely spaced substantially L-shaped bellcranks, each of said bellcranks having a portion at the juncture of the legs thereof connected to said frame for pivotal movement about a longitudinally extending axis, a transversely extending rod having each end thereof pivotally connected to an end of a respective bellcrank whereby said bellcranks are constrained to pivot in unison with respect to said frame in the same direction, and ball and socket connection means for connecting the end of each bellcrank opposite the end thereof connected to said rod to said body.

14. A cab-over-engine type motor vehicle having a longitudinal frame, a cab, and means for mounting said cab on said frame including a pair of pads of resilient material, said pads being carried by said frame and adapted to be firmly pressed into engagement with said cab, said pads being transversely spaced from a vertical plane passing through the longitudinal median line of said frame, said resilient means being releasable to disconnect the rearward end of said cab from said frame, mounting structure operatively interconnecting the forward end of said cab to said frame including a pair of transversely spaced substantially L-shaped bellcranks, each of said bellcranks having a portion of the juncture of the legs thereof connected to said frame for pivotal movement about a longitudinally extending axis, a transversely extending rod having each end thereof pivotally connected to an end of a respective bellcrank whereby said bellcranks are constrained to pivot in unison with respect to said frame in the same direction, and ball and socket connection means for connecting the end of each bellcrank opposite the end thereof connected to said rod to said cab, and latch means for preventing pivotal movement of said bellcranks with respect to said frame whereby said cab is capable of pivoting about a substantially horizontal axis extending transversely through said ball and socket connection means between a normally lowered position and a raised forwardly tilted position when said resilient means are released.

15. A cab-over-engine type motor vehicle having a longitudinal frame, a cab, and means for mounting said cab on said frame including a pair of pads of resilient material, said pads being carried by said frame, the underside of the rearward end of said cab being adapted to be firmly pressed into engagement with said pads, said pads being transversely spaced from a vertical plane passing through the longitudinal median line of said frame, said resilient means being releasable to disconnect the rearward end of said cab from said frame, mounting structure operatively interconnecting the forward end of said cab to said frame including a pair of transversely spaced bellcranks, each of said bellcranks having a pair of legs extending substantially perpendicular with respect to each other and having a portion at the juncture of the legs thereof connected to said frame for pivotal movement about a longitudinally extending axis, one leg of each of said bellcranks extending generally vertically and the other leg thereof extending generally horizontally, a rod extending transversely beneath said frame having each end thereof pivotally connected to the free end of the generally vertically extending leg of a respective bellcrank whereby said bellcranks are constrained to pivot in unison with respect to said frame in the same direction, and ball and socket connection means for connecting the free end of the generally horizontally extending leg of each bellcrank to said cab including a ball element fixed to the free end of each of said generally horizontally extending legs and a trunnion element fixed to and depending from the underside of said cab having a socket for receiving said ball element, and latch means for preventing pivotal movement of said bellcranks with respect to said frame whereby said cab is capable of pivoting about a substantially horizontal axis extending transversely through said ball and socket connection means between a normally lowered position and a raised forwardly tilted position when said resilient means are released.

References Cited in the file of this patent

UNITED STATES PATENTS

| | | |
|---|---|---|
| 2,138,114 | Nelson | Nov. 29, 1938 |
| 2,171,947 | Parker | Sept. 5, 1939 |
| 2,689,747 | Kolbe | Sept. 21, 1954 |
| 2,951,548 | Crockett et al. | Sept. 6, 1960 |